3,084,988
PROCESS FOR THE COLOURATION OF FIBRES BASED ON POLYACRYLONITRILE
Robert Frédéric Michel Sureau, Enghien-les-Bains, Gilbert Krémer, Ermont, and Pierre Marie Joseph Obellianne, Soisy-sous-Montmorency, France, assignors to Compagnie Française des Matieres Colorantes, Paris, France, a French company
No Drawing. Filed July 22, 1960, Ser. No. 44,548
2 Claims. (Cl. 8—41)

The present invention relates to the colouration of fibres based on polyacrylonitrile dyestuffs of the general formula:

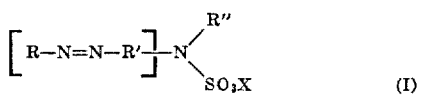  (I)

in which R is the residue of a diazotisable, aromatic or heterocyclic, primary amine, R' is the residue of an amino hydroxy or keto-enol coupling compound, R" is an atom of hydrogen, or an alkyl or aryl residue, and X is an atom of hydrogen or a cation.

The radical

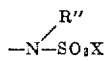

may be attached either to R or R' and when it is attached to R' it may constitute the auxochrome group owing to which R' acquires the character of a coupling compound.

R and R' must not contain carboxyl or sulphonic groups not attached to the nitrogen atom. On the other hand, R may be substituted by one or more halogen atoms or alkyl, alkoxy, acrylamino, nitro, sulphonamido, sulphone, nitrile or other analogous radicals, and R' may be substituted by one or more halogen atoms or alkyl, alkoxy, amino, alkylamino, dialkylamino, mono- or di-hydroxyalkylamino, alkylhydroxyalkylamino, hydroxy or other analogous radicals.

Dyestuffs of general Formula I are in general very soluble in water, owing to the sulphamic radical. On the other hand, it is known that the sulphonic group attached to the nitrogen atom is easily hydrolysed in an aqueous acid medium. It has been found that this property may be turned to account in applying the dyestuffs of general Formula I to the dyeing of fibres based on acrylic polymers, by proceeding, for example, in the following way: A dyebath is prepared by dissolving the desired amount of dyestuff in water and a proportion of mineral or organic acid is added of the order of that usually employed for dyeing acrylic fibres with basic dyestuffs, e.g. 2–3% based on the weight of the fibres. The fibre is introduced at about 50° C. At this temperature hydrolysis is practically nil. By means of raising the temperature, this hydrolysis becomes appreciable and the desulphonated dyestuff is progressively liberated and goes evenly on the fibre.

It has been found that by judicious selection of the components of the dyestuffs of the general Formula I, as well as the nature of the acid used, bright and full-bodied shades of great interest can be obtained. In particular, the dyeings obtained are generally of a quality superior to those given by the corresponding non-sulphonated dyestuffs.

The latter are in fact often not sufficiently soluble to be used without inconvenience. On the other hand, the dyestuffs of general Formula I in general give dyeings which are more even and sometimes more full-bodied than the corresponding non-sulphonated dyestuffs.

The preparation of the dyestuffs of general Formula I may be carried out in any one of several ways, for example:

(1) A primary amine of the formula

  (II)

is diazotised and the diazo derivative is coupled with an amino, hydroxy or keto-enol compound not containing a sulphamic group. In this method of formation, it may be advantageous to use instead of the compound of the general Formula II the disulphamate

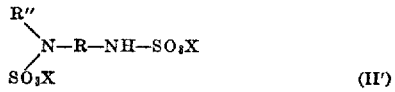  (II')

which, according to a known property, hydrolyses in the presence of nitrous acid to give the same diazo derivative as the compound of the general Formula II.

(2) A diazo derivative of a primary amine not containing a sulphamic group is coupled with a sulphamic derivative of the general formula

  (III)

(3) The sulphamic derivative is prepared directly from an aminoazo dyestuff of the general formula

R—N=N—R'—NHR"  (IV)

for example, by the action of chlorosulphonic acid on a pyridine or α-picoline solution of the compound of the general Formula IV.

In the general Formulae II, II', III and IV, R, R', R" and X have the same significance as above and are capable of being substituted as was indicated for the general Formula I.

In the following examples, which illustrate the invention without limiting it, the parts are by weight unless the contrary is indicated.

Example 1

0.05 part of the dyestuff of the formula

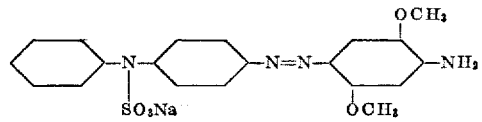

are dissolved in 200 parts of water at 50° C. 2 parts of normal sulphuric acid and 0.2 part of a condensation product from castor oil and ethylene oxide whose turbidity point is over 100° C. are added. 5 parts of polyacrylonitrile yarn are introduced at 50° C. and the temperature is raised progressively to boiling point over three quarters of an hour, and is then maintained at the boil for an hour.

A full-bodied violet-blue shade is obtained which has very good general fastness and is brighter and more even than that of the non-sulphonated dyestuff.

Example 2

5 parts of 2-aminothiazole are dissolved in 150 parts by volume of 60% acetic acid and 5 parts by volume of concentrated sulphuric acid. 28.5 parts of a sulphuric acid solution of nitrosyl chloride, corresponding to 3.5 parts of sodium nitrite, are added gradually to this solution cooled to −5° C. The mixture is stirred for half an hour, then poured into 8.5 parts of diphenylamine dissolved in 150 parts by volume of acetic acid. After stirring for 3 hours, the mineral acid is neutralised with dry sodium acetate and the product is diluted with 500 parts of water. The precipitated dyestuff is filtered off, washed with water and dried.

10 parts of this dyestuff are dissolved in 25 parts of α-picoline. The solution obtained is introduced in a mixture resulting from the reaction of 6.25 parts by volume of chlorosulphonic acid with 25 parts by volume of α-picoline, while maintaining the temperature at 20° C. The mixture is then taken to 50° C. for 3 hours, and is then poured into 250 parts of water and neutralised with sodium carbonate. After distilling off the picoline, the dyestuff is precipitated by salting out, filtered off and dried.

A dyestuff which is soluble in water is obtained, with the formula

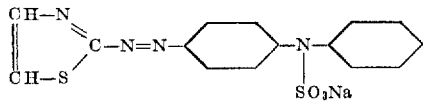

which dyes polyacrylic fibres a blue-violet shade under conditions similar to those described in Example 1.

*Example 3*

13.7 parts of 2,5-dimethoxyaniline are dissolved in 150 parts of water and 30 parts by volume of 10 N hydrochloric acid. The solution is cooled to 5° C. and diazotised by the addition of an aqueous solution of 6.9 parts of sodium nitrite. After 20 minutes at 5–10° C., the solution of the diazo derivative obtained is filtered and introduced into a solution of 27 parts of 2-methoxy-5-methylaniline N-sodium sulphonate in 300 parts of water and 300 parts by volume of a 2 N solution of sodium carbonate. After stirring for two hours, the dyestuff is precipitated by the addition of 200 parts of sodium chloride, and is filtered off and dried at moderate temperature.

The dyestuff thus obtained dyes polyacrylic fibres, under the same conditions as in Example 1, a bright violet having very good general fastness.

In the following table a certain number of dyestuffs of analogous properties are grouped together.

| Ex. | Dyestuff | Shade of the dyes on polyacrylic fibres |
|---|---|---|
| 4 | CH₃O—⟨ ⟩—N(SO₃Na)—⟨ ⟩—N=N—⟨ ⟩(OCH₃)(OCH₃)—NH₂ | Blue. |
| 5 | ⟨ ⟩—N(SO₃Na)—⟨ ⟩—N=N—⟨ ⟩(OCH₃)(CH₃)—NH₂ | Do. |
| 6 | ⟨ ⟩—N(SO₃Na)—⟨ ⟩—N=N—⟨ ⟩(CH₃)(CH₃)—NH₂ | Do. |
| 7 | CH₃O—⟨ ⟩—N(SO₃Na)—⟨ ⟩—N=N—⟨ ⟩(CH₃)(CH₃)—NH₂ | Green-blue. |
| 8 | ⟨ ⟩—N(SO₃Na)—⟨ ⟩—N=N—⟨ ⟩(OCH₃)—NH₂ | blue-grey. |
| 9 | CH₃O—⟨ ⟩—N(SO₃Na)—⟨ ⟩—N=N—⟨ ⟩(OCH₃)—NH₂ | Do. |
| 10 | CH₃O—⟨ ⟩—N(SO₃Na)—⟨ ⟩—N=N—⟨ ⟩(OCH₃)(CH₃)—N(C₂H₄OH)₂ | Blue-green. |
| 11 | CH₃O—⟨ ⟩—N(SO₃Na)—⟨ ⟩—N=N—⟨ ⟩(OCH₃)(CH₃)—NHCH₂—CHOH—CH₂OH | Green-blue. |
| 12 | CH₃O—⟨ ⟩—N(SO₃Na)—⟨ ⟩—N=N—⟨ ⟩(OCH₃)(CH₃)—NH₂ | Do. |

| Ex. | Dyestuff | Shade of the dyes on polyacrylic fibres |
|---|---|---|
| 13 | Ph-N(SO₃Na)-C₆H₄-N=N-(naphthyl)-NHC₂H₅ | Do. |
| 14 | Ph-N(SO₃Na)-C₆H₄-N=N-C₆H₃(OCH₃)-NH-Ph | Turquoise-blue. |
| 15 | CH₃O-C₆H₄-N(SO₃Na)-C₆H₄-N=N-C₆H₃(OCH₃)-NH-Ph | Green-blue. |
| 16 | 2-OCH₃, 5-CH₃-C₆H₃-N=N-C₆H₂(OCH₃)(CH₃)-NHSO₃Na | Red-violet. |
| 17 | 2-OCH₃, 5-CH₃-C₆H₃-N=N-C₆H₂(OCH₃)(OCH₃)-NHSO₃Na | Bluish-red. |
| 18 | 2,5-(OCH₃)₂-C₆H₃-N=N-C₆H₂(OCH₃)₂-NHSO₃Na | Red-violet. |
| 19 | 4-Cl-2,5-(OCH₃)₂-C₆H₂-N=N-C₆H₂(OCH₃)₂-NHSO₃Na | Ruby. |
| 20 | 4-NO₂-2,5-(OCH₃)₂-C₆H₂-N=N-C₆H₂(OCH₃)₂-NHSO₃Na | Red. |
| 21 | 4-CN-2,5-(OCH₃)₂-C₆H₂-N=N-C₆H₂(OCH₃)₂-NHSO₃Na | Bordeaux. |
| 22 | NaSO₃NH-C₆H₄-N=N-C₆H₂(OH)(CH₃)-NHC₂H₅ | Brown. |
| 23 | 2,5-(OCH₃)₂-C₆H₃-N=N-(naphthyl)-NHSO₃Na | Blue. |
| 24 | 2-OCH₃, 5-CH₃-C₆H₃-N=N-(naphthyl)-NHSO₃Na | Violet-blue. |
| 25 | 2-OCH₃, 5-CH₃-C₆H₃-N=N-C₆H₃(OCH₃)-N(Ph)(SO₃Na) | Ruby. |

| Ex. | Dyestuff | Shade of the dyes on polyacrylic fibres |
|---|---|---|
| 26 | 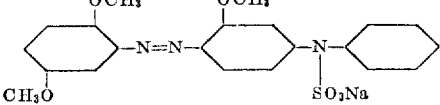 | Violet. |
| 27 | 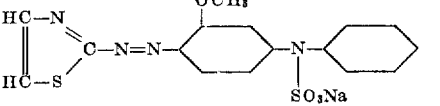 | Do. |
| 28 | 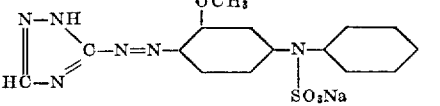 | Scarlet. |
| 29 | 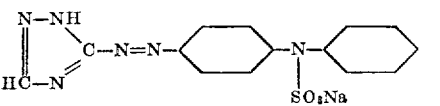 | Do. |
| 30 | 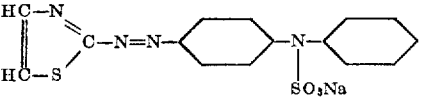 | Violet. |
| 31 | 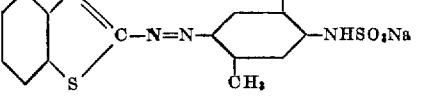 | Ruby. |
| 32 | 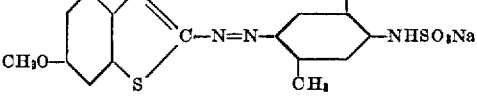 | Bright-violet. |
| 33 | 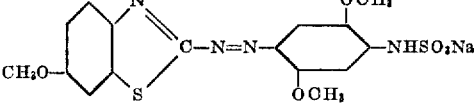 | Reddish-violet. |
| 34 | 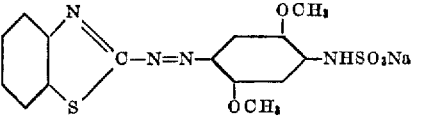 | Bordeaux. |
| 35 | 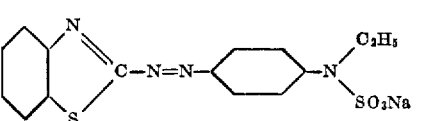 | Red-violet. |
| 36 | 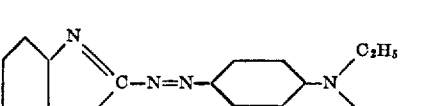 | Do. |
| 37 | 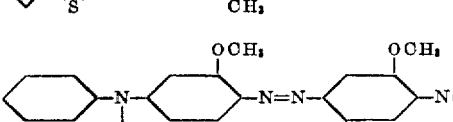 | Blue. |
| 38 | 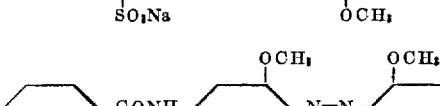 | Do. |

| Ex. | Dyestuff | Shade of the dyes on polyacrylic fibres |
|---|---|---|
| 39 | 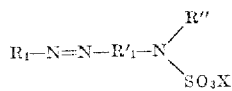 | Violet. |
| 40 | 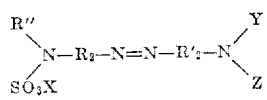 | Orange-red. |
| 41 | Cl—⟨⟩(OCH₃)(OCH₃)—N=N—⟨⟩(OCH₃)—N(SO₃Na)—⟨⟩ | Blue-violet. |

What we claim is:

1. Process for the colouration of fibres based on polyacrylonitrile in which a dyebath is prepared by dissolving a dyestuff selected from the group consisting of:

$$R_1-N=N-R'_1-N\begin{matrix}R''\\SO_3X\end{matrix}$$

and $$\begin{matrix}R''\\SO_3X\end{matrix}N-R_2-N=N-R'_2-N\begin{matrix}Y\\Z\end{matrix}$$

in which $R_1$ represents the residue, after suppression of the amino group, of an amine selected from the group consisting of diazotable aromatic and heterocyclic primary amines, $R'_1$ represents an arylene group which is substituted by a member selected from the group consisting of the hydrogen atom and alkyl and alkoxy groups, $R_2$ represents a p-phenylene group, $R'_2$ represents an arylene group which is substituted by a member selected from the group consisting of the hydrogen atom and alkyl, alkoxy and hydroxy groups, $R''$ represents a member selected from the group consisting of the hydrogen atom and alkyl and aryl groups, X represents a member selected from the hydrogen atom and cations, Y and Z each represent a member selected from the group consisting of the hydrogen atom and alkyl and hydroxyalkyl groups in water and adding a member selected from the group consisting of mineral and organic acids, the fibres then being introduced into the bath at a temperature such that hydrolysis of the dyestuff is substantially nil and the temperature then being raised so as to hydrolyse the dyestuff.

2. Process as claimed in claim 1 in which the temperature at which the fibres are introduced into the dyebath is about 50° C.

References Cited in the file of this patent
UNITED STATES PATENTS

| | | |
|---|---|---|
| 2,830,043 | Merian | Apr. 8, 1958 |
| 2,868,774 | Straley et al. | Jan. 13, 1959 |
| 2,952,505 | Carter et al. | Sept. 13, 1960 |
| 2,953,420 | Hees et al. | Sept. 20, 1960 |
| 2,955,901 | Kruckenberg | Oct. 11, 1960 |

UNITED STATES PATENT OFFICE
CERTIFICATE OF CORRECTION

Patent No. 3,084,988                                  April 9, 1963

Robert Frédéric Michel Sureau et al.

It is hereby certified that error appears in the above numbered patent requiring correction and that the said Letters Patent should read as corrected below.

In the heading to the printed specification, between lines 9 and 10, insert the following:

Claims priority, application France July 29, 1959

Signed and sealed this 5th day of November 1963.

(SEAL)
Attest:

ERNEST W. SWIDER

Attesting Officer

EDWIN L. REYNOLDS

Acting Commissioner of Patents